United States Patent

Nishibata et al.

[11] 3,979,358
[45] Sept. 7, 1976

[54] HEAT RESISTANT RUBBERY POLYMER COMPOSITION

[75] Inventors: Shiyuji Nishibata, Hisai; Kazumasa Hirose, Yokkaichi; Kuniharo Harada, Yokohama; Tokuro Fukumori, Mie, all of Japan

[73] Assignee: Japan Synthetic Rubber Co., Ltd., Tokyo, Japan

[22] Filed: Oct. 11, 1974

[21] Appl. No.: 514,214

[30] Foreign Application Priority Data

Oct. 15, 1973 Japan.............................. 48-115518

[52] U.S. Cl................. 260/45.75 N; 260/45.75 W; 260/45.8 N; 260/45.85 E; 260/784; 260/814
[51] Int. Cl.²............................................. C08J 3/20
[58] Field of Search................ 260/45.85 E, 45.8 N, 260/814, 784, 94.7 A, 94.7 S, 45.75 N, 45.75 W

[56] References Cited
UNITED STATES PATENTS

| | | | |
|---|---|---|---|
| 3,635,862 | 1/1972 | Dunn | 260/45.75 |
| 3,817,916 | 6/1974 | Parks | 260/45.85 |

*Primary Examiner*—V.P. Hoke
*Attorney, Agent, or Firm*—Toren, McGeady and Stanger

[57] ABSTRACT

A heat resistant rubbery polymer composition which comprises a rubbery polymer and, incorporated therein, at least one member selected from the group consisting of phenylenediamine compound represented by the following general formula (I)

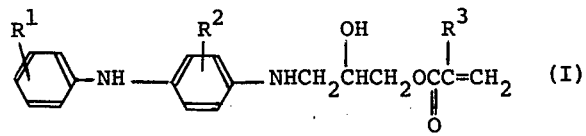

wherein $R^1$ and $R^2$ stand for a hydrogen, fluorine, chlorine or bromine atom or a hydrocarbon residue having 1 to 12 carbon atoms, and $R^3$ stands for a hydrogen atom or a hydrocarbon residue having 1 to 4 carbon atoms, and at least one member selected from the group consisting of mercaptobenzo-1,3-diazole and mercaptobenzo-1,3-diazole salt represented by the following general formula (II)

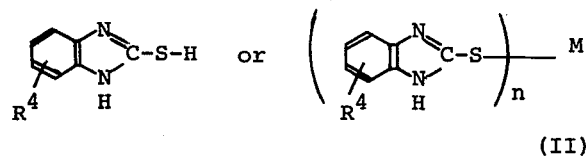

wherein $R^4$ stands for a hydrogen, fluorine, chlorine or bromine atom or hydrocarbon residue having 1 to 12 carbon atoms, M is a metal of the group II or VIII of the Periodic Table, and $n$ is 2 or 3.

7 Claims, No Drawings

HEAT RESISTANT RUBBERY POLYMER COMPOSITION

This invention relates to a rubbery polymer composition having a good heat resistance. More particularly, the invention relates to a rubbery polymer composition having a good heat resistance, which comprises a rubbery polymer and, incorporated therein, a compound represented by the following general formula

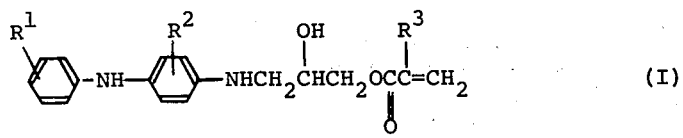

wherein $R^1$ and $R^2$ stand for a hydrogen, fluorine, chlorine or bromine atom or a hydrocarbon residue having 1 to 12 carbon atoms, and $R^3$ stands for a hydrogen atom or a hydrocarbon residue having 1 to 4 carbon atoms,
and a 1,3-diazole or its salt represented by the following general formula

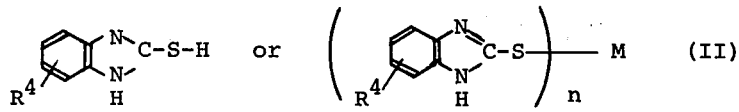

wherein $R^4$ stands for a hydrogen, fluorine, chlorine or bromine atom or a hydrocarbon residue having 1 to 12 carbon atoms. M is a metal of the group II or VIII of the Periodic Table, and $n$ is 2 or 3.

It is known that rubbery polymers are degraded under influence of heat, light, oxygen, ozone, etc. and their properties are drastically reduced. Various known degradation-preventive agents are used for prevention of such reduction of properties of rubbery polymers.

Most of these known degradation-preventive agents are organic compounds or their salts. Accordingly, when rubber products including these degradation-preventive agents come in contact with a lipophilic compound, the compounded degradation-preventive agents are extracted and their activity is often lost. Those skilled in the art frequently experience such undesired phenomenon in acrylonitrile-butadiene rubbers (NBR) having good oil resistance.

As a result of our research efforts to overcome this defect, we found that the heat resistance of rubbery polymers is very conspicuously improved by using a composite degradation-preventive agent comprising a specific degradation-preventive agent having functional groups capable of reacting with a rubbery polymer at the vulcanization step and a 1,3-diazole compound or its salt and that by addition of this composite degradation-preventive agent, the heat resistance wherein contact with oil can also be highly improved. Based on this finding, we have now completed this invention.

More specifically, in accordance with this invention, there is provided a heat-resistant rubbery polymer composition which comprises a rubbery polymer and, incorporated therein, a phenylenediamine compound represented by the following general formula (I)

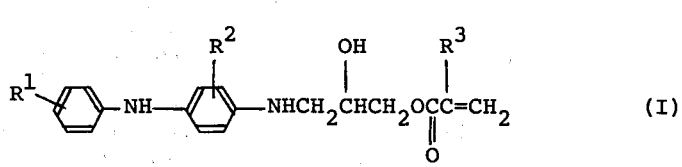

wherein $R^1$ and $R^2$ stand for a hydrogen, fluorine, chlorine or bromine atom or a hydrocarbon residue having 1 to 12 carbon atoms, and $R^3$ stands for a hydrogen atom or a hydrocarbon residue having 1 to 4 carbon atoms,
and mercaptobenzo-1,3-diazole or its salt represented by the following general formula (II)

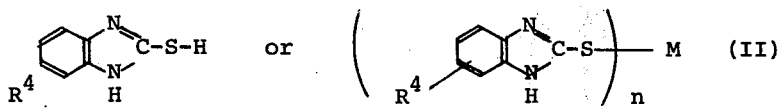

wherein $R^4$ stands for a hydrogen, fluorine, chlorine or bromine atom or a hydrocarbon residue having 1 to 12 carbon atoms. M is a metal of the group II or VIII of the Periodic Table, and $n$ is 2 or 3. As the compound represented by the general formula (I) [hereinafter referred to as "compound (I)"] to be used in this invention, there can be mentioned, for example, β-hydroxy-γ-(n'-phenyl-p-phenylenediamino)propyl acrylate, β-hydroxy-γ-(n'-phenyl-p-phenylenediamino)propyl methacrylate, β-hydroxy-γ-(n'-tolyl-p-phenylenediamino)propyl acrylate, β-hydroxy-γ-(n'tolyl-p-phenylenediamino)propyl methacrylate and the like.

As preferred examples of the compound represented by the general formula (II) [hereinafter referred to as "compound (II)"], there can be mentioned mercaptobenzo-1,3-diazole, 2-mercapto-4-methylbenzo-1,3-diazole, 2-mercapto-5-ethylbenzo-1,3-diazole, zinc mercaptobenzo-1,3-diazole, magnesium mercaptobenzo-1,3-diazole, nickel mercaptobenzo-1,3-diazole, calcium 2-mercapto-4-methylbenzo-1,3-diazole, zinc 2-mercapto-4-methylbenzo-1,3-diazole, nickel 2-mercapto-4-methylbenzo-1,3-diazole, nickel 2-mercapto-5-ethylbenzo-1,3-diazole and the like.

Amounts used of these compounds (I) and (II) are not particularly critical, but in general, each of the compounds (I) and (II) is used in an amount of 0.01 to 10 parts by weight, preferably 0.1 to 5 parts by weight, per 100 parts by weight of the rubbery polymer. If the amounts of these additives are too small, no substantial effect can be obtained. When these compounds are incorporated in too large amounts, a sufficient effect can be obtained but undesired phenomena, such as, promotion of scorching and plasticization are brought about in addition to the intended degradation-preventive effect. Accordingly, it is not preferred that the compounds (I) and (II) are used in too large or too small amounts.

The kind of the polymer to which the composite degradation-preventive agent is applied is not particularly critical, but good results are obtained when it is applied to diene polymers which readily undergo thermal degradation, such as polybutadiene, styrene-butadiene copolymers, acrylonitrile-butadiene copolymers, polyisoprene and polychloroprene.

Also the method for addition of the composite degradation-preventive agent is not particularly critical. For instance, it is possible to adopt a dry-blending method using a roll or Branbury's mixer, a method comprising adding a dispersion of the composite degradation-preventive agent to a rubber latex, and the like.

This invention will now be illustrated in more detail by reference to the following Examples which do not limit the scope of this invention.

EXAMPLE 1

Rubber compounds were prepared according to the compounding recipe shown in Table 1. In samples of this invention, a compound represented by the following formula

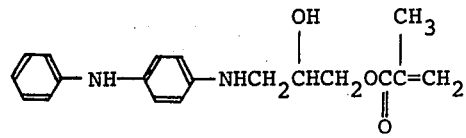

was used as the compound (I) of the composite degradation-preventive agent, and zinc mercaptobenzo-1,3-diazole or zinc 2-mercapto-4-methylbenzo-1,3-diazole was used as the compound (II) of the composite degradation-preventive agent. In comparative samples, the compound (I) or (II) alone was incorporated. The control sample including no degradation-preventive agent was similarly prepared. In each sample, kneading was conducted in a Branbury's mixer, and components for vulcanization were added in an open mill for rubber. Each compound was pressvulcanized at 155°C. for 20 minutes, and each vulcanized sample was subjected to the thermal degradation test and the oil resistance thermal degradation test to obtain the results shown in Table 2.

Table 1

| Components | Compounding Recipe Amount (parts by weight) |
|---|---|
| NBR | 100 |
| Zinc oxide | 5 |
| Stearic acid | 1 |
| SRF carbon black | 50 |
| Paraplex G-25 (plasticizer) | 5 |
| Sulfur | 0.5 |
| Nocceler TT | 2 |
| Nocceler CZ | 1.5 |
| Degradation-preventive agents | each being incorporated in an amount of 0.005 mole per 100 g of rubber |

Table 2

Results of Degradation Tests

| | Degradation-Preventive Agent This Invention | |
|---|---|---|
| Item | (I) and mercapto-benzo-1,3-diazole zinc salt (II) | (I) and 2-mercapto-4-methylbenzo-1,3-diazole zinc salt (II) |
| Before degradation test | | |
| tensile strength (Kg/cm$^2$) | 225 | 222 |
| elongation (%) | 450 | 490 |
| hardness (JIS-A) | 65 | 65 |
| After test tube degradation test (120°C.) | | |
| tensile strength change ratio (%): | | |
| 168 hours' degradation test | +1 | ±0 |
| 240 hours' degradation test | −1 | −2 |
| elongation change ratio (%): | | |
| 168 hours' degradation test | −24 | −22 |
| 240 hours' degradation test | −29 | −33 |
| tensile product change ratio (%): | | |
| 168 hours' degradation test | −23 | −22 |
| 240 hours' degradation test | −30 | −34 |

| | Degradation-Preventive Agent Comparison | | |
|---|---|---|---|
| Item | not added | (I) alone | mercaptobenzo-1,3-diazole zinc salt (II) alone | 2-mercapto-4-methylbenzo-1,3-diazole zinc salt (II) alone |
| Before degradation test | | | | |
| tensile strength (Kg/cm$^2$) | 213 | 223 | 220 | 218 |

Table 2-continued

| Item | | | | |
|---|---|---|---|---|
| elongation (%) | 420 | 480 | 440 | 450 |
| hardness (JIS-A) | 65 | 65 | 65 | 65 |
| After test tube degradation test (120°C) | | | | |
| tensile strength change ratio (%): | | | | |
| 168 hours' degradation test | −2 | −7 | −3 | −1 |
| 240 hours' degradation test | −20 | −9 | −15 | −17 |
| elongation change ratio (%): | | | | |
| 168 hours' degradation test | −30 | −26 | −27 | −28 |
| 240 hours' degradation test | −58 | −41 | −50 | −52 |
| tensile product change ratio (%): | | | | |
| 168 hours' degradation test | −31 | −31 | −29 | −28 |
| 240 hours' degradation test | −67 | −46 | −59 | −60 |

| | Degradation-Preventive Agent | |
|---|---|---|
| | This Invention | |
| Item | (I) and mercapto-benzo-1,3-diazole zinc salt (II) | (I) and 2-mercapto-4-methylbenzo-1,3-diazole zinc salt (II) |
| After test tube degradation test (120°C) | | |
| hardness change (point): | | |
| 168 hours' degradation test | +4 | +4 |
| 240 hours' degradation test | +7 | +6 |
| After test tube degradation test (130°C) | | |
| tensile strength change ratio (%): | | |
| 168 hours' degradation test | −1 | +5 |
| 240 hours' degradation test | −10 | −3 |
| elongation change ratio (%): | | |
| 168 hours' degradation test | −30 | −33 |
| 240 hours' degradation test | −52 | −51 |
| tensile product change ratio (%): | | |
| 168 hours' degradation test | −36 | −29 |
| 240 hours' degradation test | −57 | −53 |

| | Degradation-Preventive Agent | | | |
|---|---|---|---|---|
| | Comparison | | | |
| Item | not added | (I) alone | mercaptobenzo-1,3-diazole zinc salt (II) alone | 2-mercapto-4-methylbenzo-1,3-diazole zinc salt (II) alone |
| After test tube degradation test (120°C) | | | | |
| hardness change (point): | | | | |
| 168 hours' degradation test | +5 | +5 | +5 | +5 |
| 240 hours' degradation test | +9 | +7 | +8 | +8 |
| After test tube degradation test (130°C) | | | | |
| tensile strength change ratio (%): | | | | |
| 168 hours' degradation test | −51 | −6 | −30 | −25 |
| 240 hours' degradation test | −63 | −24 | −55 | −57 |
| elongation change ratio (%): | | | | |
| 168 hours' degradation test | −80 | −45 | −70 | −75 |
| 240 hours' degradation test | −94 | −69 | −85 | −88 |
| tensile product change ratio (%): | | | | |
| 168 hours' degradation test | −90 | −48 | −80 | −80 |
| 240 hours' degradation test | −98 | −76 | −92 | −94 |

| | Degradation-Preventive Agent | |
|---|---|---|
| | This Invention | |
| Item | (I) and mercapto-benzo-1,3-diazole zinc salt (II) | (I) and 2-mercapto-4-methylbenzo-1,3-diazole zinc salt (II) |
| After test tube degradation test (130°C) | | |
| hardness change (point): | | |
| 168 hours' degradation test | +8 | +6 |
| 240 hours' degradation test | +12 | +11 |
| After oil resistance thermal degradation test[1] | | |
| tensile strength change ratio (%) | −20 | −23 |
| elongation change ratio (%) | −22 | −26 |
| tensile product change ratio (%) | −38 | −43 |
| hardness change (point) | −9 | −11 |

| | Degradation-Preventive Agent | | | |
|---|---|---|---|---|
| | Comparison | | | |
| Item | not added | (I) alone | mercaptobenzo-1,3-diazole zinc salt (II) alone | 2-mercapto-4-methylbenzo-1,3-diazole zinc salt (II) alone |
| After test tube degradation test (130°C) | | | | |
| hardness change (point): | | | | |
| 168 hours' degradation test | +11 | +8 | +10 | +10 |
| 240 hours' degradation test | +21 | +13 | +17 | +18 |
| After oil resistance thermal degradation test[1] | | | | |
| tensile strength change ratio (%) | −72 | −38 | −50 | −55 |
| elongation change ratio (%) | −70 | −43 | −60 | −62 |
| tensile product change ratio (%) | −92 | −72 | −80 | −82 |

Table 2-continued

| hardness change (point) | −7 | −9 | −8 | −8 |
|---|---|---|---|---|

Note
*)Oil resistance test was conducted at 120°C. for 168 hours by immersing the sample in oil No. 3 according to JIS, and then, the thermal degradation test was performed at 130°C. for 96 hours according to the test tube method (the oil resistance thermal degradation test was conducted in the same manner in the subsequent Examples.)

From the results shown in Table 2, it will readily be understood that in the heat resistant polymer composition containing the composite degradation-preventive agent of this invention composed of the phenylenediamine compound (I) and zinc mercapto-1,3-diazole or zinc 2-mercapto-4-methylbenzo-1,3-diazole (II), because of the presence of the compound (I) having a functional group capable of reacting with the polymer at the vulcanization step and compound (II), the resistance to thermal degradation and the resistance to thermal degradation under contact with oil are highly improved.

EXAMPLE 2

In the same manner as in Example 1, samples were prepared by using as the compound (II) mercaptobenzo-1,3-diazole or 2-mercapto-4-methylbenzo-1,3-diazole and were subjected to the degradation tests to obtain results shown in Table 3.

From the results shown in Table 3, it will readily be understood that the heat resistant polymer composition comprising the composite degradation-preventive agent of this invention is highly improved in respect to the resistance to thermal degradation and the resistance to thermal degradation under contact with oil.

Table 3

Results of Degradation Tests

| Item | Degradation-Preventive Agent This Invention | |
|---|---|---|
| | (I) and mercapto-benzo-1,3-diazole (II) | (I) and 2-mercapto-4-methylbenzo-1,3-diazole (II) |
| Before degradation test | | |
| tensile strength (Kg/cm$^2$) | 216 | 225 |
| elongation (%) | 445 | 510 |
| hardness (JIS-A) | 65 | 65 |
| After test tube degradation test (120°C.) | | |
| tensile strength change ratio (%): | | |
| 168 hours' degradation test | −5 | −3 |
| 240 hours' degradation test | −9 | −5 |
| elongation change ratio (%): | | |
| 168 hours' degradation test | −24 | −25 |
| 240 hours' degradation test | −36 | −36 |
| tensile product change ratio (%): | | |
| 168 hours'0 degradation test | −28 | −27 |
| 240 hours' degradation test | −40 | −40 |
| hardness change (point): | | |
| 168 hours' degradation test | +5 | +4 |
| 240 hours' degradation test | +7 | +7 |

| Item | Degradation-Preventive Agent Comparison | | | |
|---|---|---|---|---|
| | not added | (I) alone | mercaptobenzo-1,3-diazole (II) alone | 2-mercapto-4-methylbenzo-1,3-diazole (II) alone |
| Before degradation test | | | | |
| tensile strength (Kg/cm$^2$) | 213 | 223 | 215 | 220 |
| elongation (%) | 420 | 480 | 430 | 470 |
| hardness (JIS-A) | 65 | 65 | 65 | 65 |
| After test tube degradation test (120°C.) | | | | |
| tensile strength change ratio (%): | | | | |
| 168 hours' degradation test | −2 | −7 | −4 | −3 |
| 240 hours' degradation test | −20 | −9 | −15 | −14 |
| elongation change ratio (%): | | | | |
| 168 hours' degradation test | −30 | −26 | −29 | −29 |
| 240 hours' degradation test | −58 | −41 | −50 | −45 |
| tensile product change ratio (%): | | | | |
| 168 hours' degradation test | −31 | −31 | −32 | −31 |
| 240 hours' degradation test | −67 | −46 | −58 | −51 |
| hardness change (point): | | | | |
| 168 hours' degradation test | +5 | +5 | +5 | +5 |
| 240 hours' degradation test | +9 | +7 | +8 | +8 |

| Item | Degradation-Preventive Agent This Invention | |
|---|---|---|
| | (I) and mercapto-benzo-1,3-diazole (II) | (I) and 2-mercapto-4-methylbenzo-1,3-diazole (II) |
| After test tube degradation test (130°C.) | | |
| tensile strength change ratio (%): | | |
| 168 hours' degradation test | +2 | −5 |
| 240 hours' degradation test | −7 | −8 |
| elongation change ratio (%): | | |
| 168 hours' degradation test | −38 | −40 |
| 240 hours' degradation test | −57 | −56 |
| tensile product change ratio (%): | | |

Table 3-continued

| | | |
|---|---|---|
| 168 hours' degradation test | −37 | −45 |
| 240 hours' degradation test | −60 | −60 |
| hardness change (point): | | |
| 168 hours' degradation test | +8 | +7 |
| 240 hours' degradation test | +13 | +11 |
| After oil resistance thermal degradation | | |
| tensile strength change ratio (%) | −32 | −33 |
| elongation change ratio (%) | −38 | −37 |
| tensile product change ratio (%) | −58 | −58 |
| hardness change (point) | −9 | −13 |

| | Degradation-Preventive Agent Comparison | | | |
|---|---|---|---|---|
| Item | not added | (I) alone | mercaptobenzo-1,3-diazole (II) alone | 2-mercapto-4-methylbenzo-1,3-diazole (II) alone |
| After test tube degradation test (130°C.) | | | | |
| tensile strength change ratio (%): | | | | |
| 168 hours' degradation test | −51 | −6 | −40 | −30 |
| 240 hours' degradation test | −63 | −24 | −57 | −57 |
| elongation change ratio (%): | | | | |
| 168 hours' degradation test | −80 | −45 | −72 | −70 |
| 240 hours' degradation test | −94 | −69 | −86 | −87 |
| tensile product change ratio (%): | | | | |
| 168 hours' degradation test | −90 | −48 | −85 | −80 |
| 240 hours' degradation test | −98 | −76 | −91 | −93 |
| hardness change (point): | | | | |
| 168 hours' degradation test | +11 | +8 | +10 | +10 |
| 240 hours' degradation test | +21 | +13 | +17 | +17 |
| After oil resistance thermal degradation | | | | |
| tensile strength change ratio (%) | −72 | −38 | −60 | −65 |
| elongation change ratio (%) | −70 | −43 | −67 | −68 |
| tensile product change ratio (%) | −92 | −72 | −85 | −88 |
| hardness change (point) | −7 | −9 | −8 | −8 |

EXAMPLE 3

In the same manner as in Example 1, the degradation tests using a Geer oven were conducted on samples prepared by using as the compound (II) calcium 2-mercapto-4-methylbenzo-1,3-diazole or nickel 2-mercapto-4-methylbenzo-1,3-diazole to obtain results shown in Table 4.

From the results shown in Table 4, the heat resistance polymer composition including the composite degradation-preventive agent of this invention is much improved over the composition including the compound (I) alone with respect to the resistance to thermal degradation and the resistance to thermal degradation under contact with oil.

Table 4

| | Degradation-Preventive Agent | | Comparison |
|---|---|---|---|
| | This Invention | | |
| Item | (I) and calcium 2-mercapto-4-methyl-benzo-1,3-diazole | (I) and nickel 2-mercapto-4-methylbenzo-1,3-diazole | (II) alone |
| Before thermal degradation test | | | |
| tensile strength (Kg/cm²) | 198 | 209 | 223 |
| elongation (%) | 535 | 580 | 480 |
| hardness (JIS-A) | 62 | 62 | 65 |
| After test tube degradation test (130°C.) | | | |
| tensile strength change ratio (%): | | | |
| 168 hours' degradation test | −3 | −6 | −6 |
| 240 hours' degradation test | −7 | −9 | −24 |
| elongation change ratio (%): | | | |
| 168 hours' degradation test | −39 | −37 | −45 |
| 240 hours' degradation test | −56 | −55 | −69 |
| tensile product change ratio (%): | | | |
| 168 hours' degradation test | −41 | −42 | −48 |
| 240 hours' degradation test | −60 | −60 | −76 |
| hardness change (point): | | | |
| 168 hours' degradation test | +8 | +7 | +8 |
| 240 hours' degradation test | +13 | +12 | +13 |
| After Geer oven degradation test (130°C.) | | | |
| tensile strength change ratio (%): | | | |
| 168 hours' degradation test | +2 | −4 | −13 |
| 240 hours' degradation test | −8 | −10 | −20 |
| elongation change ratio (%): | | | |
| 168 hours' degradation test | −45 | −47 | −52 |
| 240 hours' degradation test | −63 | −65 | −77 |
| tensile product change ratio (%): | | | |
| 168 hours' degradation test | −44 | −49 | −59 |
| 240 hours' degradation test | −65 | −67 | −81 |
| hardness change (point): | | | |
| 168 hours' degradation test | +10 | +10 | +10 |
| 240 hours' degradation test | +15 | +16 | +18 |
| After oil resistance thermal degradation test | | | |
| tensile strength change ratio (%) | −20 | −30 | −38 |
| elongation change ratio (%) | −33 | −37 | −43 |

Table 4-continued

| | Degradation-Preventive Agent | | Comparison |
| Item | This Invention | | |
| | (I) and calcium 2-mercapto-4-methyl-benzo-1,3-diazole | (I) and nickel 2-mercapto-4-methylbenzo-1,3-diazole | (II) alone |
|---|---|---|---|
| tensile product change ratio (%) | −44 | −52 | −72 |
| hardness change (point) | −9 | −9 | −9 |

COMPARATIVE EXAMPLE 1

A sample was prepared in the same manner as in Example 1 by using a phenylene diamine compound outside the scope of this invention instead of the compound (I) and zinc mercaptobenzo-1,3-diazole as the compound (II), and the sample was tested in the same manner as in Example 1 to obtain results shown in Table 5.

From the results shown in Table 5, it will readily be understood that the comparative composition is much inferior to a composition including the composite degradation-preventive agent of this invention with respect to the resistance to thermal degradation under contact with oil.

Table 5

| Item | Additives phenylisopropyl-p-phenylene-diamine and zinc mercaptobenzo-1,3-diazole |
|---|---|
| Before degradation test | |
| tensile strength (Kg/cm²) | 201 |
| elongation (%) | 460 |
| hardness (JIS-A) | 65 |
| After test tube degradation test (120°C.) | |
| tensile strength change ratio (%): | |
| 168 hours' degradation test | +1 |
| 240 hours' degradation test | −2 |
| After test tube degradation test (120°C.) | |
| elongation change ratio (%): | |
| 168 hours' degradation test | −25 |
| 240 hours' degradation test | −31 |
| tensile product change ratio (%): | |
| 168 hours' degradation test | −24 |
| 240 hours' degradation test | −32 |
| hardness change (point): | |
| 168 hours' degradation test | +5 |
| 240 hours' degradation test | +8 |
| After test tube degradation test (130°C.) | |
| tensile strength change ratio (%): | |
| 168 hours' degradation test | +2 |
| 240 hours' degradation test | −3 |
| elongation change ratio (%): | |
| 168 hours' degradation test | −37 |
| 240 hours' degradation test | −51 |
| tensile product change ratio (%) | |
| 168 hours' degradation test | −36 |
| 240 hours' degradation test | −53 |
| hardness change (point): | |
| 168 hours' degradation test | +9 |
| 240 hours' degradation test | +13 |
| After oil resistance thermal degradation test | |
| tensile strength change ratio (%) | −55 |
| elongation change ratio (%) | −60 |
| tensile product change ratio (%) | −82 |
| hardness change (point) | −6 |

COMPARATIVE EXAMPLES 2 and 3

A sample was prepared in the same manner as in Example 1 by using a tri(nonylated phenyl)phosphite or ditearyl thio dipropionate instead of compound (II) in Example 1, and the sample was tested in the same manner as in Example 1 to obtain results as shown in Table 6.

From the results shown in Table 6, it will readily be understood that, in case the compound excepting mercaptobenzo-1,3-diazole or salt thereof as compound (II) is applied, superior results can not be obtained.

Table 6

| | Degradation-Preventive Agent | |
| | Comparative example 2 | Comparative example 3 |
| Item | (I) and Tri(nonylated phenyl) phosphite | (I) and Distearyl thio dipropionate |
|---|---|---|
| Before thermal degradation test | | |
| tensile strength (Kg/cm²) | 203 | 195 |
| elongation (%) | 565 | 520 |
| hardness (JIS-A) | 61 | 63 |
| After test tube degradation test (130°C.) | | |
| tensile strength change ratio (%): | | |

Table 6-continued

| Item | Degradation-Preventive Agent | |
|---|---|---|
| | Comparative example 2 (I) and Tri(nonylated phenyl) phosphite | Comparative example 3 (I) and Distearyl thio dipropionate |
| 168 hours' degradation test | −6 | −7 |
| 240 hours' degradation test | −35 | −29 |
| elongation change ratio (%): | | |
| 168 hours' degradation test | −50 | −47 |
| 240 hours' degradation test | −71 | −71 |
| tensile product change ratio (%): | | |
| 168 hours' degradation test | −53 | −51 |
| 240 hours' degradation test | −85 | −80 |
| hardness change (point): | | |
| 168 hours' degradation test | +11 | +9 |
| 240 hours' degradation test | +16 | +13 |
| After geer oven degradation test (130°C.) | | |
| tensile strength change ratio (%): | | |
| 168 hours' degradation test | −10 | −15 |
| 240 hours' degradation test | −30 | −29 |
| elongation change ratio (%): | | |
| 168 hours' degradation test | −51 | −48 |
| 240 hours' degradation test | −75 | −76 |
| tensile product change ratio (%): | | |
| 168 hours' degradation test | −56 | −58 |
| 240 hours' degradation test | −85 | −83 |
| hardness change (point): | | |
| 168 hours' degradation test | +14 | +13 |
| 240 hours' degradation test | +19 | +17 |
| After oil resistance thermal degradation test | | |
| tensile strength change ratio (%) | −58 | −51 |
| elongation change ratio (%) | −70 | −63 |
| tensile product change ratio (%) | −87 | −82 |
| hardness change (point) | −4 | −6 |

What we claim is:

1. A heat resistant rubbery polymer composition which comprises a rubbery polymer and, incorporated therein, at least one member selected from the group consisting of phenylenediamine compounds represented by the following general formula (I)

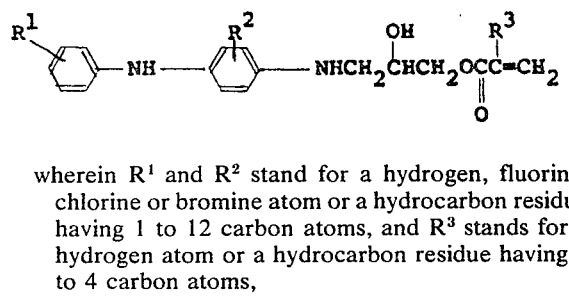

wherein R¹ and R² stand for a hydrogen, fluorine, chlorine or bromine atom or a hydrocarbon residue having 1 to 12 carbon atoms, and R³ stands for a hydrogen atom or a hydrocarbon residue having 1 to 4 carbon atoms,
and at least one member selected from the group consisting of mercaptobenzo-1,3-diazole and mercaptobenzo-1,3-diazole salts represented by the following general formula (II)

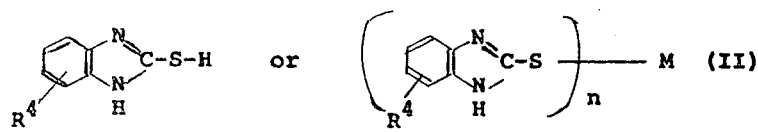

wherein R⁴ stands for a hydrogen, fluorine, chlorine or bromine atom or a hydrocarbon residue having 1 to 12 carbon atoms, M is a metal of the group II or VIII of the Periodic Table, and n is 2 or 3, compounds I and II each being present in an amount effective to prevent degradation of the rubbery polymer.

2. A heat resistant rubbery polymer composition as set forth in claim 1 wherein the compound represented by the formula (I) is at least one member selected from the group consisting of β-hydroxy-γ-(n'-phenyl-p-phenylenediamino)propyl acrylate, β-hydroxy-γ-(n'-phenyl-p-phenylenediamino)propyl methacrylate, β-hydroxy-γ-(n'-tolyl-p-phenylenediamino)propyl acrylate and β-hydroxy-γ-(n'-tolyl-p-phenylenediamino)propyl methacrylate.

3. A heat resistant rubbery polymer composition as set forth in claim 1 wherein the compound represented by the general formula (II) is at least one member selected from the group consisting of mercaptobenzo-1,3-diazole, 2-mercapto-4-methylbenzo-1,3-diazole and 2-mercapto-5-ethylbenzo-1,3-diazole.

4. A heat resistant rubbery polymer composition as set forth in claim 2 wherein the compound represented by the general formula (II) is at least one member selected from the group consisting of zinc mercaptobenzo-1,3-diazole, magnesium mercaptobenzo-1,3-diazole, nickel mercaptobenzo-1,3-diazole, calcium 2-mercapto-4-methylbenzo-1,3-diazole, zinc 2-mercapto-4-methylbenzo-1,3-diazole, nickel 2-mercapto-4-methylbenzo-1,3-diazole and nickel 2-mercapto-5-ethylbenzo-1,3-diazole.

5. A heat resistant rubbery polymer composition as set forth in claim 1 wherein the rubbery polymer is at least one member selected from the group consisting of polybutadiene, styrene-butadiene copolymers, acrylonitrile-butadiene copolymers, polyisoprene and polychloroprene.

6. A heat resistant rubbery polymer composition which comprises an acrylonitrile-butadiene copolymers and, incorporated therein,

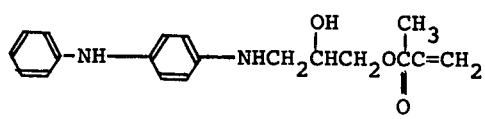

and at least one member selected from the group consisting of mercaptobenzo-1,3-diazole, 2-mercapto-4-methylbenzo-1,3-diazole, zinc mercaptobenzo-1,3-diazole, zinc 2-mercapto-4-methylbenzo-1,3-diazole, calcium 2-mercapto-4-methylbenzo-1,3-diazole, nickel 2-mercapto-4-methylbenzo-1,3-diazole compounds I and II each being present in an amount effective to prevent degradation of the rubbery polymer.

7. The composition of claim 1 wherein compounds I and II are each present in amounts from 0.01 to 10 parts by weight per 100 parts by weight of the rubbery polymer.

* * * * *